United States Patent
Nalawadi et al.

(10) Patent No.: US 6,892,274 B2
(45) Date of Patent: May 10, 2005

(54) METHOD AND APPARATUS FOR HANDLING DATA TRANSFERS

(75) Inventors: Rajeev K. Nalawadi, Folsom, CA (US); Steve P. Mooney, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 396 days.

(21) Appl. No.: 10/236,344

(22) Filed: Sep. 5, 2002

(65) Prior Publication Data

US 2004/0049631 A1 Mar. 11, 2004

(51) Int. Cl.$^7$ ............................................. G06F 12/00
(52) U.S. Cl. ........................ 711/112; 711/100; 711/154; 711/171; 710/10; 369/30.01; 369/47.1
(58) Field of Search ................................ 711/112, 100, 711/154, 171; 710/10; 369/30.01, 47.1

(56) References Cited

U.S. PATENT DOCUMENTS

| | | | | |
|---|---|---|---|---|
| 5,854,942 A | * | 12/1998 | Penokie | 710/10 |
| 5,909,592 A | * | 6/1999 | Shipman | 710/10 |
| 6,502,212 B1 | * | 12/2002 | Coyle et al. | 714/43 |
| 6,557,058 B1 | * | 4/2003 | Jackson | 710/60 |
| 6,718,401 B2 | * | 4/2004 | Nalawadi et al. | 710/13 |
| 6,789,163 B2 | * | 9/2004 | Fox et al. | 711/112 |
| 2001/0001870 A1 | * | 5/2001 | Ofek et al. | 711/112 |
| 2003/0056059 A1 | * | 3/2003 | Fox et al. | 711/112 |

* cited by examiner

*Primary Examiner*—Stephen Elmore
(74) *Attorney, Agent, or Firm*—Sharon Wong

(57) ABSTRACT

Embodiments of the present invention provide for implementation of data transfers in an efficient manner. The 48-bit LBA mechanism requires two sets of I/O writes to IDE registers on primary channel or secondary channel. The two sets of I/O writes to the primary or secondary channel registers are performed by setting a status register to a first or second state appropriately depending on the data. Embodiments of the present invention provide a single set of writes to I/O registers when the size of the data transfer is equal to or below a threshold value.

24 Claims, 3 Drawing Sheets

METHOD AND APPARATUS FOR HANDLING DATA TRANSFERS

BACKGROUND

Background Information

Many storage hard disk drives designed for use in computer systems today utilize an IDE standard interface. The IDE interface has proven very cost effective and has grown to wide acceptance in the PC motherboard industry. The IDE standard provides allows for most of the controller electronics that were previously found on a controller card be located at the hard disk mechanism and in the chipset. Since the IDE interface can be placed on the motherboard, because of its relatively simple electronics, a controller card is not needed, and hence an expansion slot is saved for other use.

For many years, operating systems accessed fixed media disk drives by specifying the Cylinder, Head and Sector to retrieve the desired data from the disk. Because of this, the Int 13 h Hard Disk Interface standardized around this type of protocol. When IDE compatible drives were first introduced, this protocol was maintained. At its most primitive level, data on an IDE compatible drive is accessed according to Logical Blocks instead of the traditional Cylinder-Head-Sector (CHS) method, even though the IDE Task File (the register level interface between the Drive and Host) is specified in the CHS format.

Combining the limitations of the Int 13 h Application Programming Interface with those of the IDE Task File, in the past, only a maximum of 528 Mb of data can be accessed in a single IDE device. Because of advances in Hard Disk technology, drives of greater than 528 Mb are now becoming cost effective and new methods of Data Addressing are required. The Hard Disk Driver developed by Intel Corporation supports three standard Data Addressing Modes: cylinder-head-sector (CHS) mode, extended cylinder-head-sector (ECHS) mode, and logical block addressing (LBA) mode.

Cylinder-Head-Sector: The standard CHS mode is available for use on all drives and is compatible with all Operating Systems. In this mode up to a maximum of 16 heads, 1023 Cylinders and 63 Sectors may be specified. If a drive supports more than 1023 Cylinders, the amount usable is limited to 1023. Using this addressing mode up to 528 Mb of data is available. Since data is arranged on the disk using a linear addressing scheme rather than the CHS parameters, the drive firmware performs this translation.

Extended Cylinder-Head-Sector: The ECHS translation mode is used for drives that have capacities larger than 528 Mb but do not support the Logical Block Addressing mode (LBA). Though this translation method is not widely accepted in the industry it will work for most DOS and MICROSOFT WINDOWS applications. Using this translation method the number of Cylinders are reduced and the number of Heads are increased until the Cylinder count is below 1024. This method will not work effectively for drives much larger that 528M and if the two least significant bits of the cylinder number are not zero, then some drive capacity may be lost in the parameter translation. Sectors that are lost because of inefficiencies in the translation algorithm are called Orphan Sectors.

Logical Block Addressing: In LBA mode, the location of data on the disk is specified using a 28-bit or 48-bit Logical Block Address. The 28-bit LBA corresponds with the drives linear addressing scheme allowing the Host to bypass the drive firmware's translation code. This is fast becoming the most widely used addressing mechanism going forward. This allows for faster disk accesses and up to 8.4 G of data is available. This method also allows the number of Orphan Sectors to be reduced to zero.

With respect to 48-bit LBA IDE storage drives, as they get larger, it becomes time consuming to set up the IDE compatible drives for a particular data transfer to/from the host to IDE devices. For example, the 48-bit LBA mechanism requires two sets of I/O writes to IDE registers. A more efficient mechanism for handling of 48-bit LBA drives and their transfers is thus desirable.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and methods have not been described in detail in order to avoid obscuring the invention.

Embodiments of the present invention provide for implementation of data transfers in an efficient manner. In a typical implementation, the 48-bit LBA mechanism requires two sets of I/O writes to IDE registers on primary channel or secondary channel. The two sets of I/O writes to the primary or secondary channel registers are performed by setting a status register to a first or second state appropriately depending on the data. Embodiments of the present invention provide a single set of writes to I/O registers when the size of the data transfer is equal to or below a threshold value.

Figure 1:
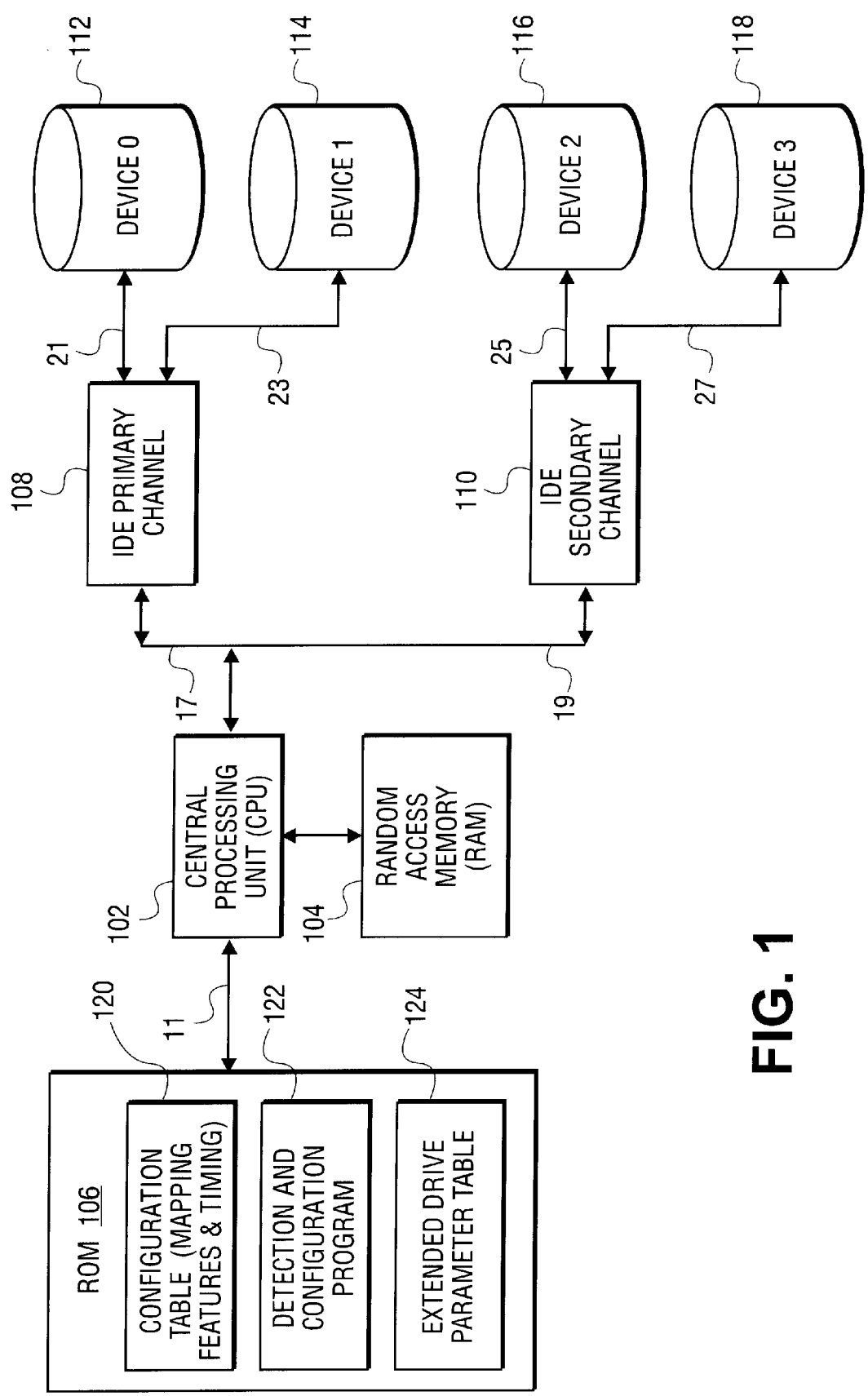
FIG. 1 illustrates a block diagram of an embodiment of an exemplary computer system embodying the present invention.

Referring to FIG. 1, a block diagram of an embodiment 100 of an exemplary computer system embodying the present invention is illustrated. The computer system includes a central processing unit, CPU 102, that is connected to a random access memory (RAM) 104, a read only memory (ROM) 106, primary IDE channel 108 and secondary IDE channel 110. The channels 108 and 110 control devices 112, 114, 116, and 118 that read and write data recorded on magnetic disks. For illustrative purposes, only a primary and secondary IDE channel 106 and 108 are illustrated. It should be understood that this invention is extensible to any number of IDE controllers and potentially multiple channels being functional when operating in native IDE mode.

ROM 106 also holds an IDE configuration table 120, detection and configuration program 122, and extended drive parameter table (EDPT) 124. There is one entry in the IDE configuration table 120 for each potential logical IDE device connected to the multiple IDE controllers and channels that may exist on a platform. IDE configuration table 120 contains configuration information necessary to configure a device on the IDE controller based on the common feature set of the IDE drive, IDE connectors, chipset capabilities and in conformance with the latest ATA Specification (for example: ATA/ATAPI-6 Specification). IDE configuration table 120 is referenced during system BIOS POST to retrieve information that is needed to program the chipset capability registers, timing registers & IDE device operational parameters on the fly, without user interaction. Hence the user can plug any drive into the computer and the software will configure the system without user intervention. All of the features or a subset of the features listed in the latest ATA specification may be supported.

Most of the latest IDE compatible drives are capable of processing all of the transfers at data throughput rates in excess or comparable to 100 MBytes/sec. One skilled in the art will recognize that the present invention is not limited to transferring data to/from IDE devices but rather can be adapted for use on other storage mediums connected to an IDE port or a parallel port. For example, embodiments of the present invention can be adapted to transfer data between the IDE compatible drive and the other locations with comparable speeds depending on the other interfaces capability. When an IDE compatible storage device supports access for greater than 137.4 GB of storage space, the IDE interface depends on a status bit (for example, a higher order bit (HOB)) in a set of IDE I/O registers associated with each drive. The 48-bit register may be defined and utilized as follows:

TABLE I

48-BIT REGISTER DEFINITION AND USAGE

| Register | "Most Recently Written" HOB = 0 | "Previous Content" HOB = 1 |
| --- | --- | --- |
| Features | Reserved | Reserved |
| Sector Count 1F2/172 | Sector Count (7:0) | Sector Count (15:8) |
| Sector Number 1F3/173 | LBA (7:0) | LBA (31:24) |
| Cylinder Low 1F4/174 | LBA (15:8) | LBA (39:32) |
| Cylinder High 1F5/175 | LBA (23:16) | LBA (47:40) |
| Device/Head 1F6/176 | Device/Head | Reserved |
| Command 1F7/177 | Command | N/A |

Embodiments of the present invention provide for implementation of IDE 48-bit LBA transfers in an efficient manner. In a typical implementation, the 48-bit LBA mechanism requires two sets of I/O writes to IDE registers on primary channel (1F0h–1F7h) or secondary channel (170h–177h). Embodiments of the present invention provide a single set of writes to I/O registers when the size of the data transfer is below a threshold value. In a typical implementation, when the size of the data transfer is below 137.4 GB, only a single set of writes to the IDE I/O registers is required. The size of the threshold value (for example, 137.4 GB) is dependent on the implementation of whether the drive should be able to support 28-bit LBA as well as 48-bit LBA accesses. There is some overlap of the storage space in case both the access models should be supported.

Embodiments of the present invention provide for implementation of IDE 48-bit LBA transfers in an efficient manner. In a typical implementation, the 48-bit LBA mechanism requires two sets of I/O writes to IDE registers on primary channel (1F0h–1F7h) or secondary channel (170h–177h). The two set of I/O writes to these Primary channel or secondary channel registers is performed by setting the HOB bit to a 0/1 appropriately depending on the data. Embodiments of the present invention provide a single set of writes to I/O registers when the size of the data transfer is equal to or below a threshold value. In a typical implementation, when the size of the data transfer is below 137.4 GB, only a single set of writes to I/O registers is required.

Figure 2:
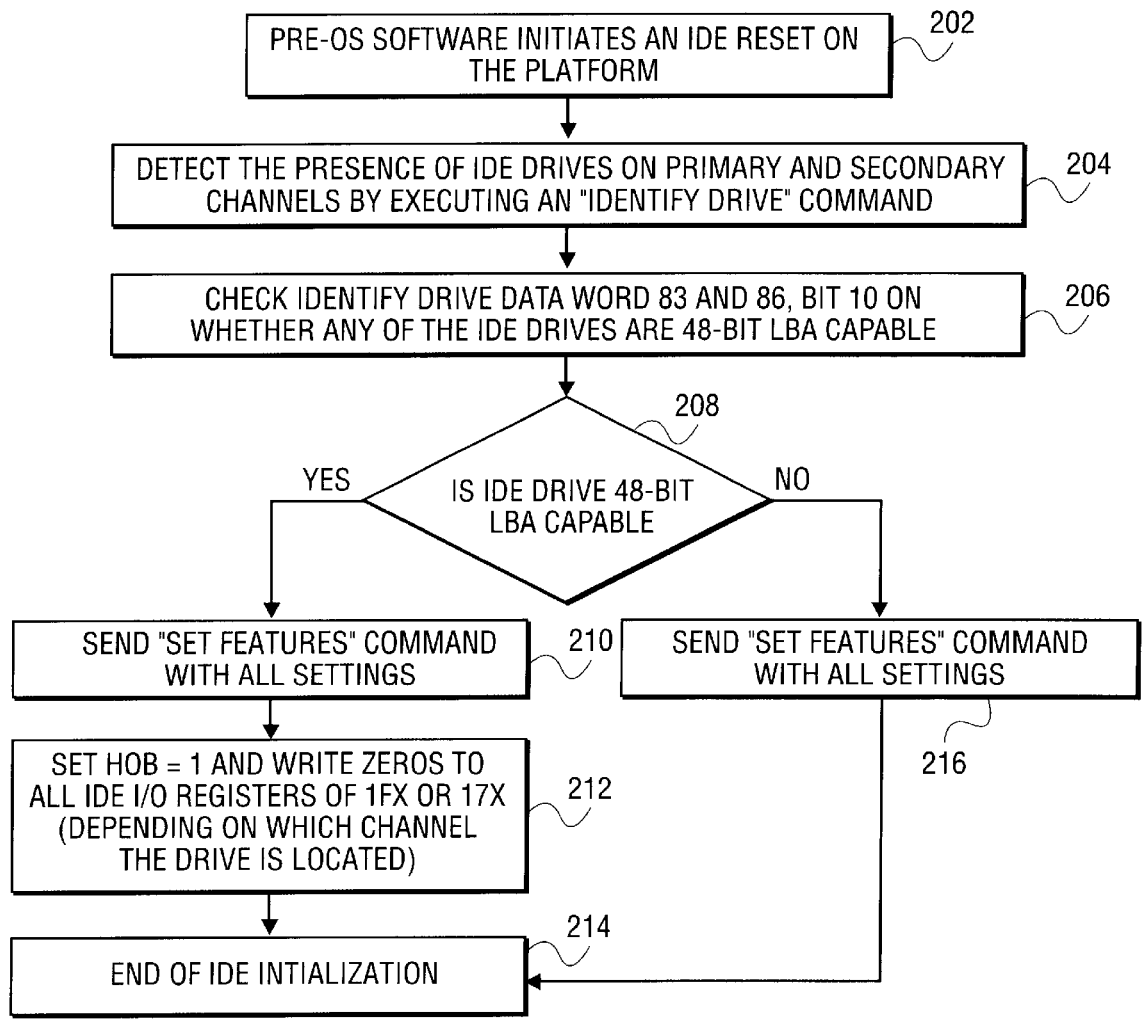
FIG. 2 illustrates a flow diagram of an embodiment of a routine for detection and initialization of IDE compatible drive(s).
Figure 3:
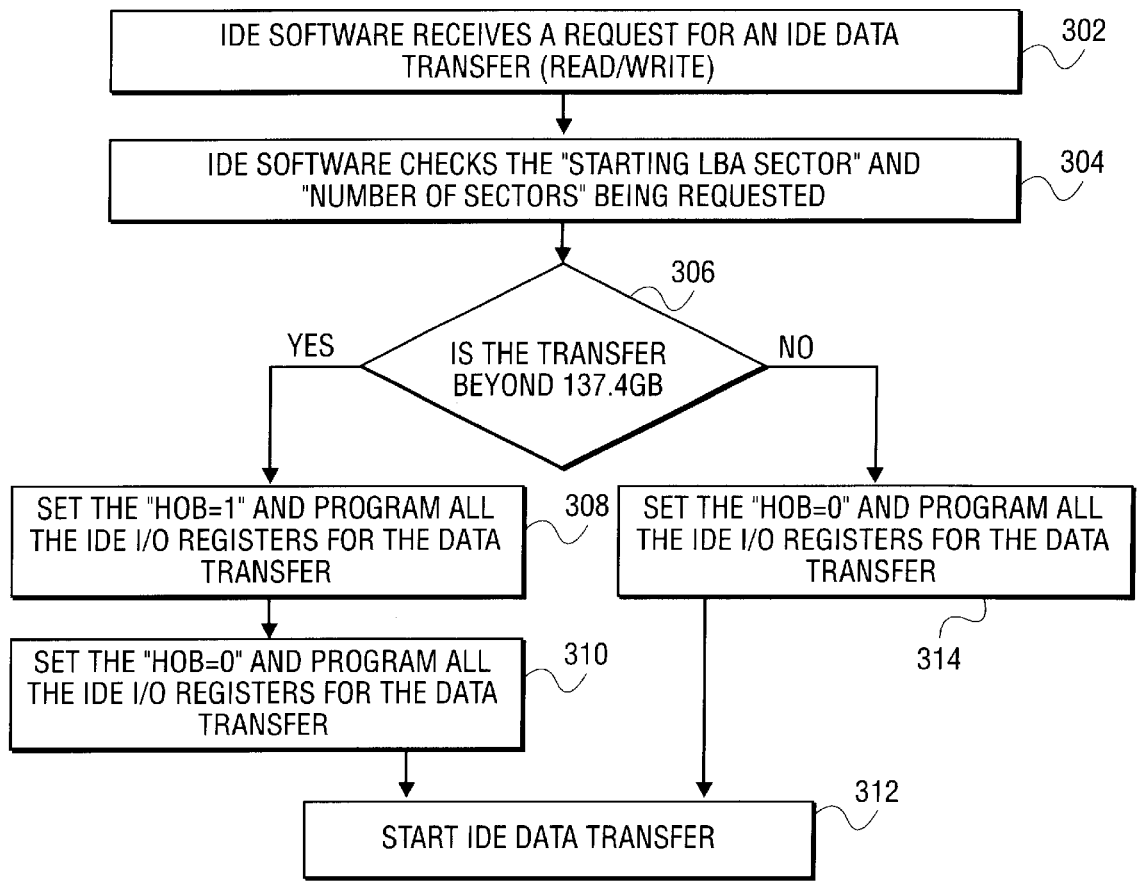
FIG. 3 illustrates a flow diagram of an embodiment of a routine for setting up data transfers for the IDE compatible drive(s) using the optimal 48-bit IDE addressing mechanism.

Referring to FIG. 2, embodiments of the present invention initialize the IDE registers of a 48-bit LBA drive. Referring to FIG. 3, after initialization, the size of the data transfer (e.g. size of LBA sector) will be compared against a threshold value to determine whether additional I/O writes to the IDE registers are necessary. In particular, FIG. 2 illustrates a flow diagram of an embodiment of a routine for detection and initialization of IDE compatible drive(s).

In step 202, an IDE reset is initiated. In a typical implementation, the drives are auto configurable and the user is not required to do anything. The user plugs in the drive and embodiments of the present invention respond appropriately to the drive.

In step 204, the presence of storage devices on the IDE controllers, either on primary/secondary channels is detected by executing an "identify drive" command. An identify drive command is issued to the IDE device by writing a specific opcode to the IDE Command Port that is directed to the controller, primary/secondary channel, master/slave Storage device. The IDE device responds with data that is interpreted to configure the drive.

Since drives are typically auto configurable, the user is not required to do anything. The user plugs in the drive and embodiments of the present invention respond appropriately to the drive. An identify drive command is issued to the IDE device by writing an opcode for the command to an I/O port.

The IDE device responds with data that is interpreted to configure the drive. In step 206, the data is used to determine whether any of the IDE compatible drives are 48-bit LBA capable. In a typical implementation, data words 83 and 86, bit 10 are checked to determine whether any of the IDE compatible drives are 48-bit LBA capable.

Not every drive vendor implements a response to this command in the same way. Also not every drive responds to a reset in the exact same way. Embodiments of the present invention are such that regardless of how the drive is reset and regardless of how the drive responds to the identify drive command, the drive can be initialized. The IDE device responds with data that is interpreted to configure the drive. The existing IDE devices in the system get configured by an "identify drive" command to get the various capabilities of the device and a "set features" Command to program the device.

In step 208, if the IDE compatible drive is 48-bit capable, a command to "set features" is sent with commands for settings (step 210).

In step 212, the high order bit is set to 1 (HOB=1) and zeros are written to IDE I/O registers of 1FX or 17X depending on which channel (i.e. primary or secondary) the drive is located. In a typical implementation, the status register includes eight indicator bits. At the beginning of a command sequence, the HOB bit of the status register is set under the control of processor. The HOB bit remains set until completion of an operation (i.e., writing zeros to IDE registers). During the time period when the HOB bit is set, the host computer is not allowed access to the remaining registers in the task file.

In step 214, initialization of the IDE is completed.

If, in step 208, the IDE compatible drive is not 48-bit capable, a command to "set features" is sent with commands for settings (step 216) and IDE initialization completed (step 214).

FIG. 3 illustrates a flow diagram of an embodiment 300 of a routine for configuring read or write data transfers with an IDE compatible drive.

In step 302, a request for an IDE data transfer is received.

In step 304, the size of the date transfer is determined. For performing a transfer to or from the IDE compatible device, a request for a group of logical addresses, typically a group of logical sectors, is required, preferably by identifying a starting logical sector value and a total number of logical sectors value. In a typical implementation, the "starting LBA sector" and "number of sectors" being requested are used to determine the size of the data transfer. In particular, a starting logical sector, the total number of logical sectors to transfer, and a pointer to the starting address of the memory range in the host computer memory with which to perform the transfer are received as input. From this information, corresponding groups of physical sectors on each physical drive may be calculated, preferably by determining values for the starting physical sector and the total numbers of physical sectors to transfer for each physical device.

If the size of the data transfer is greater than a threshold value (step 306), control passes to step 308, where the high order bit is set to "1" (HOB=1) and registers programmed for data transfer (step 308). In a typical implementation, if the size of the data transfer is greater than 137.4 GB, the high order bit is set to "1" (HOB=1) and the IDE I/O registers are programmed for data transfer.

The high order bit is then set to "0" (HOB=0) and all the IDE I/O registers are programmed for data transfer (step 310).

The IDE data transfer is then started (step 312).

If the size of the data transfer is less than or equal to a threshold value (step 306), control passes to step 314, where the high order bit is set to "0" (HOB=0) and registers programmed for data transfer (step 314). In a typical implementation, if the size of the data transfer is less than or equal to 137.4 GB, the high order bit is set to "0" (HOB=0) and all the IDE I/O registers are programmed for data transfer. Embodiments of the present invention thus provide a single set of writes to I/O registers when the size of the data transfer is less than or equal to a threshold value.

The IDE data transfer is then started (step 312).

It will be appreciated that when external softwares (for example, operating systems, applications) do most of their data transfers, the accesses tend to be localized around certain regions of the storage device. This is a proven mechanism that has been used to provide an optimal method for transferring data. In addition the IDE interface and the devices support the transfers of multiple sectors by issuing a single set of commands to the IDE I/O task file registers. When the data transfer accesses ping-pong across the threshold boundaries there will be two sets of IDE I/O register accesses required like a normal scenario where this mechanism is not implemented. It will be evident for those skilled in the art that such cases can be avoided by partitioning the storage devices appropriately.

It will be appreciated that the actual steps in the memory transfer and access operations will vary depending upon the particular hardware and the types of drives being used. It will also be appreciated that various modifications to this basic routine, many of which are described below, may also be made consistent with the principles of the invention.

It will also be appreciated that information exchange and command protocols for the IDE standard is generally known in the art. In particular, the standards include dedicated registers and command structures for implementing data transfer and control of peripheral devices. In addition, it will be appreciated that the electrical interconnections and associated support circuitry (e.g., power supplies, data buffers, clocking circuits, etc.) between these different devices and systems are within the skill of the ordinary artisan.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method for configuring one or more data transfers with a storage device, comprising:

initializing the storage device;

determining size of the data transfer;

comparing the size of the data transfer to a threshold value;

configuring the storage device based upon the comparison of the size of the data transfer to the threshold value; and initiating the data transfer based on the threshold value.

2. The method of claim 1, wherein the store device comprises an integrated device electronics (IDE) compatible device.

3. The method of claim 1, wherein determining size of the data transfer further comprises:

determining a starting logical block addressing (LBA) sector and number of sectors requested for data transfer.

4. The method of claim 1, wherein comparing the size of the data transfer to a threshold value further comprises:

comparing the size of the data transfer to 137.4 GB.

5. The method of claim 1, wherein configuring the storage device based upon the comparison of the size of the data transfer to the threshold value further comprises:

configuring for a single set of I/O writes to IDE registers in response to transfers equal to or below the threshold value.

6. The method of claim 5, wherein configuring for a single set of I/O writes to IDE registers in response to transfers equal or below the threshold value further comprises:

setting an indicator to a first state; and programming IDE registers for data transfer.

7. The method of claim 6, wherein setting an indicator to a first state further comprises:

setting a higher order bit to one.

8. The method of claim 5, wherein programming IDE registers for data transfer further comprises:

writing zeros to IDE I/O registers of 1FX or 17X depending on which channel the drive is located.

9. The method of claim 6, wherein configuring the storage device based upon the comparison of the size of the data transfer to the threshold value further comprises:

configuring for more than one set of I/O writes to IDE registers in response to transfers above the threshold value.

10. The method of claim 9, wherein configuring for more than one set of I/O writes to IDE registers in response to transfers above the threshold value further comprises:

setting the indicator to the first state;
programming registers for data transfer;
setting the indicator to the second state; and
programming registers for data transfer.

11. The method of claim 10, wherein
setting the indicator to the first state comprises setting a higher order bit to one; and
setting the indicator to the second state comprises setting a higher order bit to zero.

12. The method of claim 1, wherein initializing the storage device further comprises:
determining whether the storage device is 48-bit LBA compatible; and
setting the 48-bit LBA compatible drive to a configuration.

13. The method of claim 12, wherein setting the 48-bit LBA compatible drive to a configuration further comprises:
setting an indicator to a first state; and
writing to selected IDE I/O registers.

14. The method of claim 13, wherein setting an indicator to a first state further comprises:
setting a higher order bit to a first state.

15. The method of claim 14, wherein setting a higher order bit to a first state further comprises:
setting a higher order bit to one.

16. The method of claim 15, wherein writing to selected IDE I/O registers further comprises:
writing zeros to selected IDE I/O registers.

17. The method claimed in claim 1, further comprising:
handling the accesses that ping-pong across the threshold value 18. A machine readable medium having stored therein a plurality of machine readable instructions executable by a processor to configure one or more data transfers with a storage device, comprising:

instructions to initialize the storage device;
instructions to determine size of the data transfer;
instructions to compare the size of the data transfer to a threshold value;
instructions to configure the storage device based upon the comparison of the size of the data transfer to the threshold value; and
instructions to initiate data transfers based on the threshold value.

19. An apparatus, comprising:
circuitry to copy a device configuration table and a device parameter table into memory, test for the existence of any storage device coupled to the interface and for each detected device, compare the size of the data transfer to a threshold value and configure the storage device based upon the comparison of the size of the data transfer to the threshold value.

20. The apparatus claimed in claim 19, wherein the storage device comprises an IDE-compatible device.

21. The apparatus claimed in claim 20, wherein the data transfer comprises a 48-bit LBA transfer.

22. A system, comprising:
circuitry to transfer data from a first storage device to a second storage device; and
circuitry to copy a device configuration table and a device parameter table into memory, test for the existence of the second storage device coupled to the interface and for each detected device, compare the size of the data transfer to a threshold value and configure the second storage device based upon the comparison of the size of the data transfer to the threshold value.

23. The system claimed in claim 22, wherein the second storage device comprises an IDE-compatible device.

24. The system claimed in claim 23, wherein the data transfer comprises a 48-bit LBA transfer.

* * * * *